(12) United States Patent
Werner

(10) Patent No.: US 7,532,441 B2
(45) Date of Patent: May 12, 2009

(54) MR READ HEAD WITH FIRST AND SECOND GAP LAYERS

(75) Inventor: Douglas Werner, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 239 days.

(21) Appl. No.: 11/559,353

(22) Filed: Nov. 13, 2006

(65) Prior Publication Data
US 2007/0070554 A1   Mar. 29, 2007

Related U.S. Application Data

(60) Continuation of application No. 10/601,021, filed on Jun. 19, 2003, now Pat. No. 7,152,305, which is a division of application No. 09/875,405, filed on Jun. 5, 2001, now Pat. No. 6,628,484.

(51) Int. Cl.
*G11B 5/127* (2006.01)
(52) U.S. Cl. .................................... 360/319; 360/320
(58) Field of Classification Search ............... 360/313, 360/319, 320, 324.2; 29/603.12, 603.14
See application file for complete search history.

(56) References Cited

U.S. PATENT DOCUMENTS

| | | | | |
|---|---|---|---|---|
| 5,568,335 A | * | 10/1996 | Fontana et al. ............ | 360/320 |
| 5,633,771 A | * | 5/1997 | Yoda et al. ............... | 360/121 |
| 5,701,221 A | * | 12/1997 | Taniyama et al. ......... | 360/327.3 |
| 5,707,538 A | * | 1/1998 | Shen et al. ............... | 216/22 |
| 5,721,008 A | * | 2/1998 | Huang et al. ............. | 427/123 |
| 5,766,780 A | * | 6/1998 | Huang et al. ............. | 428/682 |
| 5,850,324 A | * | 12/1998 | Wu et al. ................. | 360/322 |
| 5,897,969 A | * | 4/1999 | Taniyama et al. ......... | 428/833 |
| 5,978,183 A | * | 11/1999 | Hsiao et al. .............. | 360/320 |
| 5,999,379 A | * | 12/1999 | Hsiao et al. .............. | 360/320 |
| 6,025,977 A | * | 2/2000 | Hu et al. ................. | 360/319 |
| 6,160,687 A | * | 12/2000 | Pinarbasi ................ | 360/320 |
| 6,563,678 B2 | * | 5/2003 | Sato ....................... | 360/320 |

* cited by examiner

*Primary Examiner*—Angel A. Castro
(74) *Attorney, Agent, or Firm*—Zilka-Kotab, PC

(57) ABSTRACT

A magetoresistive (MR) read head according to one embodiment includes a shield layer with a recessed portion and a protruding portion defined by the recessed portion; a first gap layer located on top of the recessed portion of the shield layer, the first gap layer including, an upper surface substantially level with an upper surface of the protruding portion of the shield layer a second gap layer located on top of the first gap layer and the protruding portion of the shield layer, an MR sensor formed above the protruding portion of the shield layer and the second gap layer. A combined thickness of the first gap layer and second gap layer is thinner adjacent to the MR sensor and the protruding portion of the shield layer than the recessed portion of the shield layer.

18 Claims, 6 Drawing Sheets

MR READ HEAD WITH FIRST AND SECOND GAP LAYERS

RELATED APPLICATIONS

The present application is a continuation of U.S. patent application Ser. No. 10/601,021, filed Jun. 19, 2003 now U.S. Pat. No. 7,152,305, which is a divisional of U.S. patent application Ser. No. 09/875,405, filed Jun. 5, 2001, now U.S. Pat. No. 6,628,484.

FIELD OF THE INVENTION

The present invention relates to magetoresistive read sensors for reading signals recorded in a magnetic medium, and more particularly, this invention relates to read sensors having improved operating characteristics.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR sensor") as a function of the strength and direction of the magnetic flux being sensed by the MR layer.

FIG. 1 illustrates a cross-sectional view of an MR head, in accordance with the prior art. As shown, an MR read head includes an MR sensor which is sandwiched between first and second gap layers G1 and G2 which are in turn sandwiched between first and second shield layers S1 and S2. Lead layers are sandwiched between the first and second gap layers for providing a sense current to the MR sensor. Magnetic fields from a magnetic disk change the resistance of the sensor proportional to the strength of the fields. The change in resistance changes the potential across the MR sensor which is processed by channel circuitry as a readback signal.

An MR read head is typically mounted to a slider which, in turn, is attached to a suspension and actuator of a magnetic disk drive. The slider and edges of the MR sensor and other layers of the read head form an air bearing surface (ABS). When a magnetic disk is rotated by the drive, the slider and one or more heads are supported against the disk by a cushion of air (an "air bearing") between the disk and the ABS. The air bearing is generated by the rotating disk. The read head then reads magnetic flux signals from the rotating disk.

There are two critical dimensions of the MR head, namely the trackwidth and resolution of the MR head. The capability of the MR head to read data recorded at high areal densities is determined by its trackwidth and its resolution.

The trackwidth of the MR read head is the length of the active or sensing region for the MR sensor and is typically defined by the photolithography and subtractive or additive processing. The trackwidth is defined by the recess generated by the photoresist PR used during a photolithography process.

Resolution, on the other hands, is determined by the gap of the read head which is the distance between the first and second shield layers at the ABS. Accordingly, this distance is the total of the thicknesses of the MR sensor and the first and second gap layers G1 and G2. When the first and second gap layers G1 and G2, which separate the MR sensor from the first and second shield layers S1 and S2, become thinner, the linear resolution of read head becomes higher. A serious limitation on the thinness of the gap layers of the read head is the potential for electrical shorting between the lead layers and the first and second shield layers. The thinner a gap layer, the more likely it is to have one or more pinholes which expose a lead layer to a shield layer. Pinholes can significantly reduce the yield of a production run of MR read heads.

It is important to note that the only place where the gap layers have to be thin is in an MR region where the MR sensor is located. The gap layers can be thicker between the lead layers and the first and second shield layers. Accordingly it is desirable if each gap layer could be thin in the MR region to provide high linear resolution and thick outside of the MR region to provide good insulation between the lead layers and the shield layers.

The MR read head of FIG. 1 accomplishes this using a two step process of depositing first gap layers before the MR sensor is deposited and a two step process of depositing second gap layers after the MR sensor is deposited. In the present device, a very thin first gap layer G1 is deposited on the first shield layer S1. An MR region is then masked and a first gap pre-fill layer G1P, which may be thicker than G1, is deposited. The mask is removed, leaving the first gap pre-fill layer G1P everywhere except in the MR region, Lead layers L1 and L2 and an MR sensor are then formed.

Next, a very thin second gap layer G2 is deposited. The MR region is then masked and a second gap pre-fill layer G2P is deposited. After lifting off the mask, the G2P layer is located everywhere except in the MR region. The result is that very thin G1 and G2 layers are in the MR region at the bottom and top of the MR sensor to provide the MR head with a high linear resolution, the G1 and G1P layers are located between the leads and the first shield layer S1 to prevent shorting between the lead layers and the first shield layer S1 and the G2 and G2P layers are located between the lead layers and the second shield layer S2 to prevent shorting between the lead layers and the second shield layer S2.

As such, the present device is capable of providing a read head which has a very thin gap layer at the MR region, and yet will prevent shorts between lead layers and the first and second shield layers.

Despite this, the MR read head of FIG. 1 includes gap layers G1, G1P, G2, and G2P which afford many non-planar surfaces in the form of beveled edges circumnavigating the MR sensor. Such non-planar surface must, in turn, be subjected to photoresist layers during processing. Due to inherent limitations of photolithography, two problems result which compromise control of the critical trackwidth and resolution dimensions.

First, the beveled edges cause reflective notching due to light scattering. See arrows in FIG. 1. Secondly, the non-planar surfaces cause non-uniform photoresist coverage during processing which, in turn, invokes the well known "swing curve" effect. FIG. 2 illustrates the manner in which the critical dimensions (trackwidth and resolution) vary as a function of photoresist thickness in accordance with the swing curve effect. As is well known, the constructive and destructive interference of reflected light within the photoresist film causes the swing curve effect.

Prior art devices have attempted to overcome the foregoing disadvantages through the addition of antireflective layers and planarization. Unfortunately, antireflective layers are only partially effective and introduce complications associated with their removal.

There is therefore a need for an MR read head with an improved gap layer which utilizes planar surfaces to avoid adversely the MR region, while providing a thin gap layer adjacent to the MR region and a thick gap layer between lead layers and the first and second shield layers.

SUMMARY OF THE INVENTION

A magetoresistive (MR) read head according to one embodiment includes a shield layer with a recessed portion and a protruding portion defined by the recessed portion; a first gap layer located on top of the recessed portion of the shield layer, the first gap layer including an upper surface substantially level with an upper surface of the protruding portion of the shield layer; a second gap layer located on top of the first gap layer and the protruding portion of the shield layer; an MR sensor formed above the protruding portion of the shield layer and the second gap layer. A combined thickness of the first gap layer and second gap layer is thinner adjacent to the MR sensor and the protruding portion of the shield layer than the recessed portion of the shield layer.

A magetoresistive (MR) read head according to another embodiment includes a shield layer with a recessed portion and a protruding portion; a first gap layer formed above the recessed portion of the shield layer the first gap layer including an upper surface substantially coplanar with an upper surface of the protruding portion of the shield layer; a second gap layer formed above the first gap layer and the protruding portion of the shield layer; and an MR sensor formed above the protruding portion of the shield layer and the second gap layer.

A magetoresistive (MR) read head according to yet another embodiment includes a shield layer with a recessed portion and a protruding portion; a first gap layer formed above the recessed portion of the shield layer, the first gap layer including a planar upper surface being contiguous with an upper surface of the protruding portion of the shield layer; a second gap layer formed above the first gap layer and the protruding portion of the shield layer; and an MR sensor formed above the protruding portion of the shield layer and the second gap layer.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
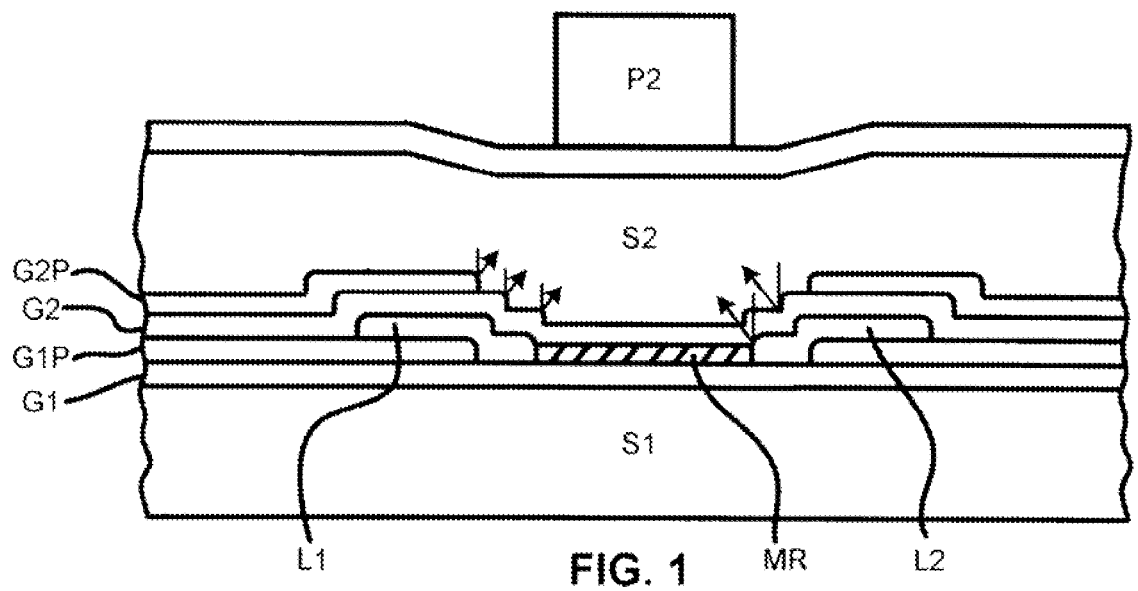
FIG. 1 illustrates a cross-sectional view of a (magetoresistive) MR head, in accordance with the prior art.
Figure 2:
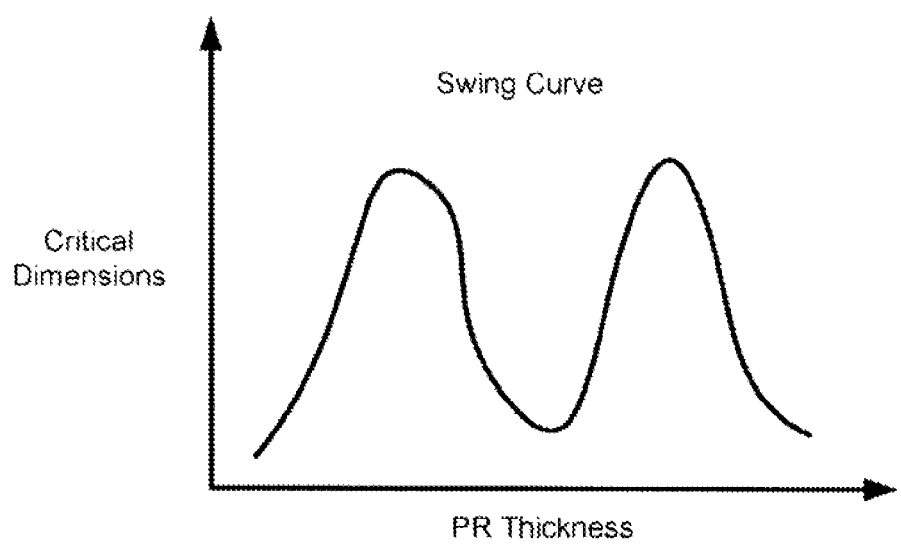
FIG. 2 illustrates the manner in which the critical dimensions vary as a function of photoresist thickness, in accordance with the swing curve effect.
Figure 3:
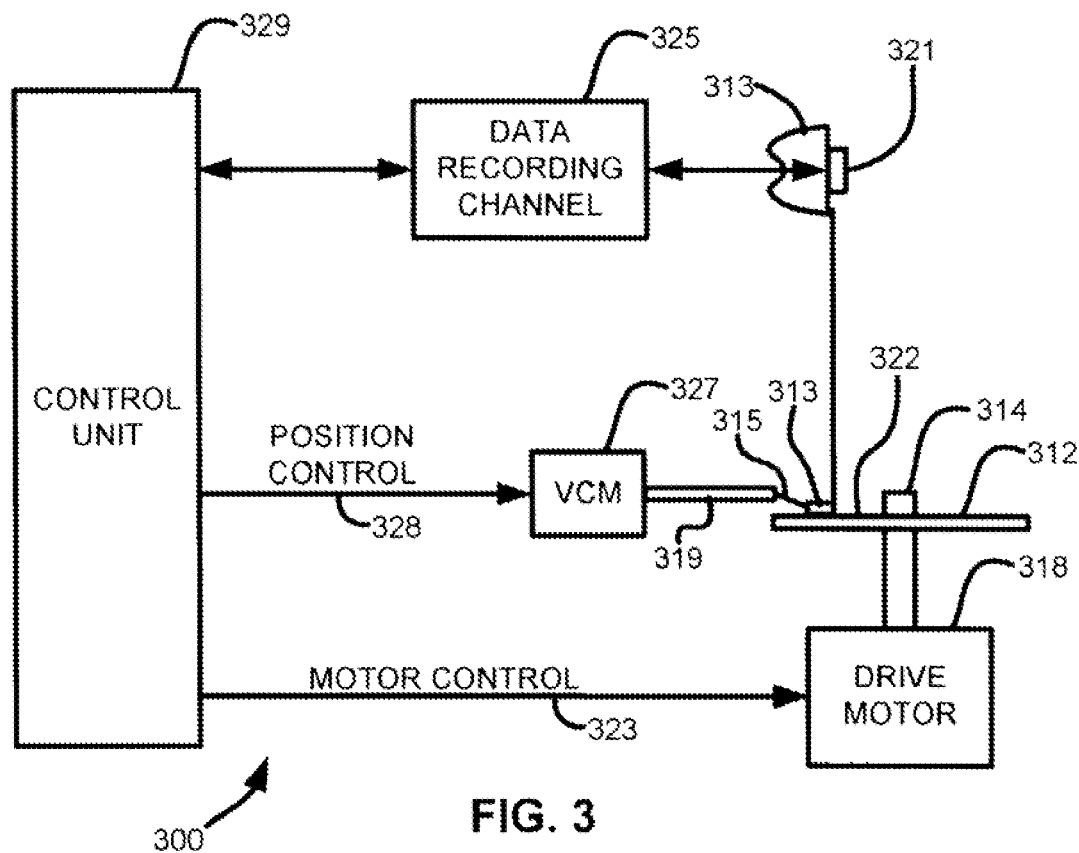
FIG. 3 is a perspective drawing of a magnetic recording disk drive system.

Referring now to FIG. 3 there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312 each slider 313 supporting one or more magnetic read/write heads 321 where the head 321 incorporates the MR sensor of the present invention. As the disks rotate slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position, slider 313 to the desired data track on disk 312. Read and write signals are communicated to and from read/write heads 321 by way of recording channel 325.

The above description of a magnetic disk storage system of the present invention, and the accompanying illustration of FIG. 3 are for representation purposes only. It should be apparent that disk stooge systems may contain a large number of disks and actuators, and each actuator may support a member of sliders.

Figure 4:
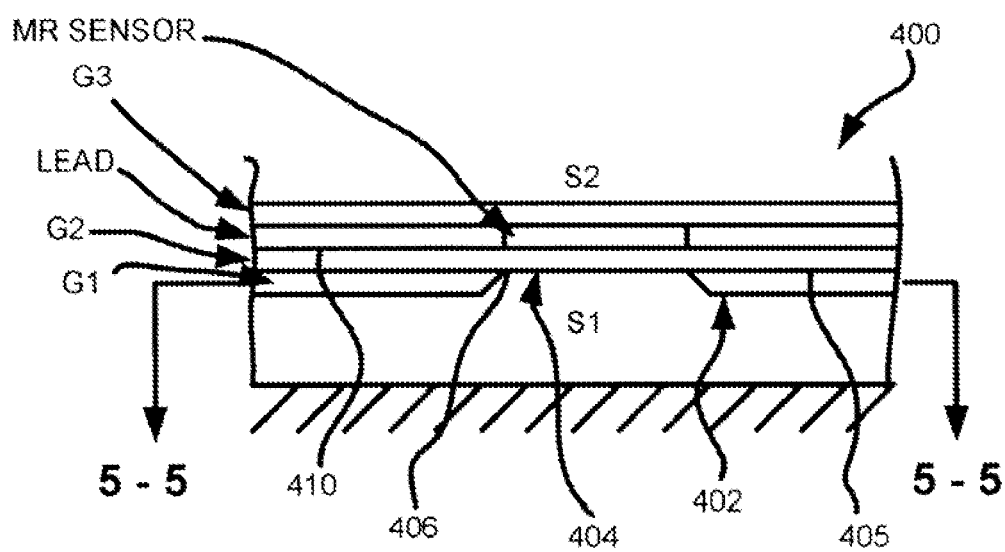
FIG. 4 illustrates an MR read head constructed in accordance with one embodiment of the present invention.

FIG. 4 illustrates an MR read head 400 constructed in accordance with one embodiment of the present invention. As shown, the MR read head 400 includes a shield layer S1 with a recessed portion 402 and a protruding portion 404 defined by the recessed portion 402. In one embodiment, the recessed portion 402 of the shield layer S1 is formed by any desired etching process. In particular, ion milling, reactive ion etching, wet etching etc. may be utilized.

Next provided is a first gap layer G1 located on top of the recessed portion 402 of the shield layer S1 The first gap layer G1 includes an upper surface 405 substantially level with an upper surface 406 of the protruding portion 404 of the shield layer S1. The first gap layer G1 and the remaining gap layers may be constructed utilizing alumina, aluminum oxide or any other desired insulating material. Moreover, such gap layers may be deposited utilizing any desired process such as sputtering or the like.

As an option, the upper surface 405 of the first gap layer G1 may reside slightly below the upper surface 406 of the protruding portion 404 of the shield layer S1. In such embodiment, a chemical-mechanical polishing process or the like may be utilized to achieve planarity. It is preferred that the upper surface 405 of the first gap layer G1 be planar and level with the upper surface 406 of the protruding portion 404 in order to avoid reflective notching and the swing curve effect, With continuing reference to FIG. 4, a second gap layer G2 is shown to be located on top of the first gap layer G1 and the protruding portion 404 of the shield layer S1. Similar to the upper surface 405 of the first gap layer G1, it is preferred that an upper surface 410 of the second gap layer G2 is planar.

Located on top of the second gap layer G2 is an MR sensor that is positioned in vertical alignment with the protruding portion 404 of the shield layer S1. In one embodiment, the size and shape of the protruding portion 404 of the shield layer S1 is similar to that of the MR sensor. Preferably, the size of the protruding portion 404 of the shield layer S1 is slightly larger than that of the MR sensor. The MR sensor may be constructed utilizing. Permalloy (nickel iron) or any other desired material. Moreover, the MR sensor may be deposited utilizing any desired process such as sputtering, vacuum deposition, plating or the like.

Also located on top of the second gap layer G2 are first and second lead layers which are connected to the MR sensor. The first and second lead layers may be constructed utilizing copper or any other conductive material. Similar to the MR sensor, the first and second lead layers may be deposited utilizing any desired process such as sputtering, vacuum deposition, plating or the like.

A third gap layer G3 is located on top of the MR sensor, the first and second lead layers, and the second gap layer G2. While not shown, it should be noted that another shield layer S2 and other layers may be deposited on top of the third gap layer G3, as is well known to those of ordinary skill. In use, the gap layers provide insulation between the lead layers and the shield layers S1 and S2.

By this design, a combined thickness of the first gap layer G1, second gap layer G2, and third gap layer G3 is thinner adjacent to the MR sensor and the protruding portion 404 of the shield layer S1 than the recessed portion 402 of the shield layer S1. As such, the lead layers enjoy the increased combined thickness of the gap layers. This is important to reduce the chance of a short occurring between the lead layers and shield layers S1 and S2.

Moreover, beveled edges and nonplanarity are avoided by maintaining planar gap layer surfaces through use of the recessed portion 402 of the shield layer S1. To this end, the detrimental ramifications of reflective notching and the swing curve effect are avoided.

Figure 5:
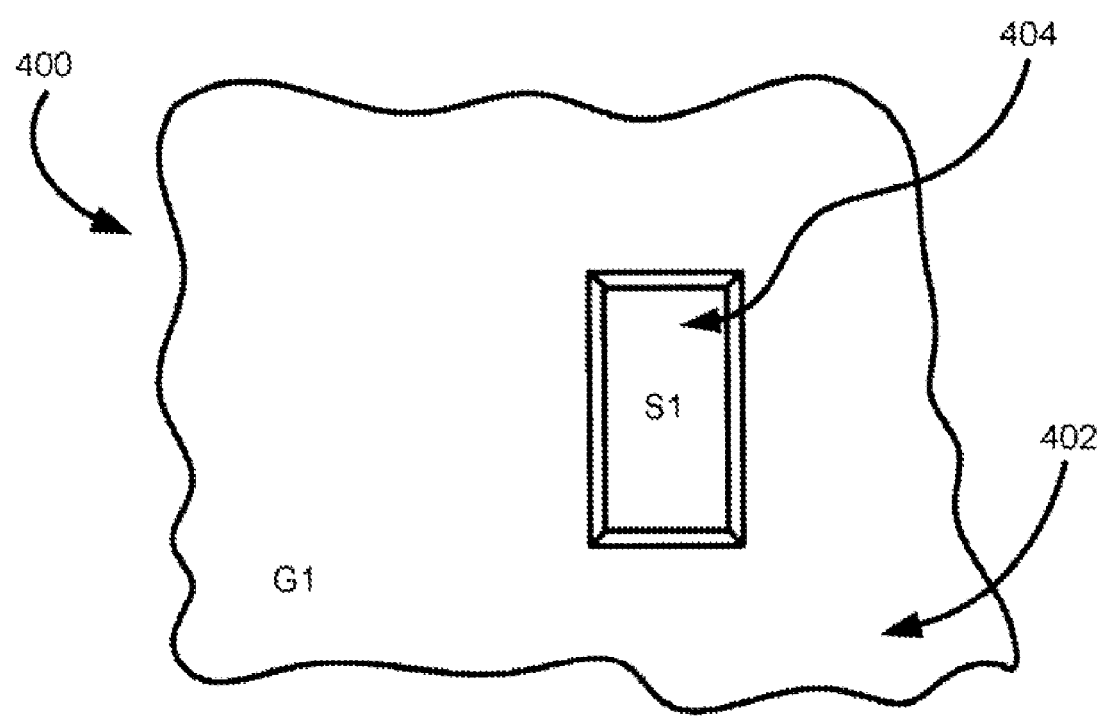
FIG. 5 illustrates a plan cross-sectional view of the MR read head taken along line 5-5 shown in FIG. 4.

FIG. 5 illustrates a plan cross-sectional view of the MR read head 400 taken along line 5-5 shown in FIG. 4. As shown, the protruding portion 404 of the shield layer S1 defines the recessed portion 402 in which the first gap layer G1 resides.

Figure 6:
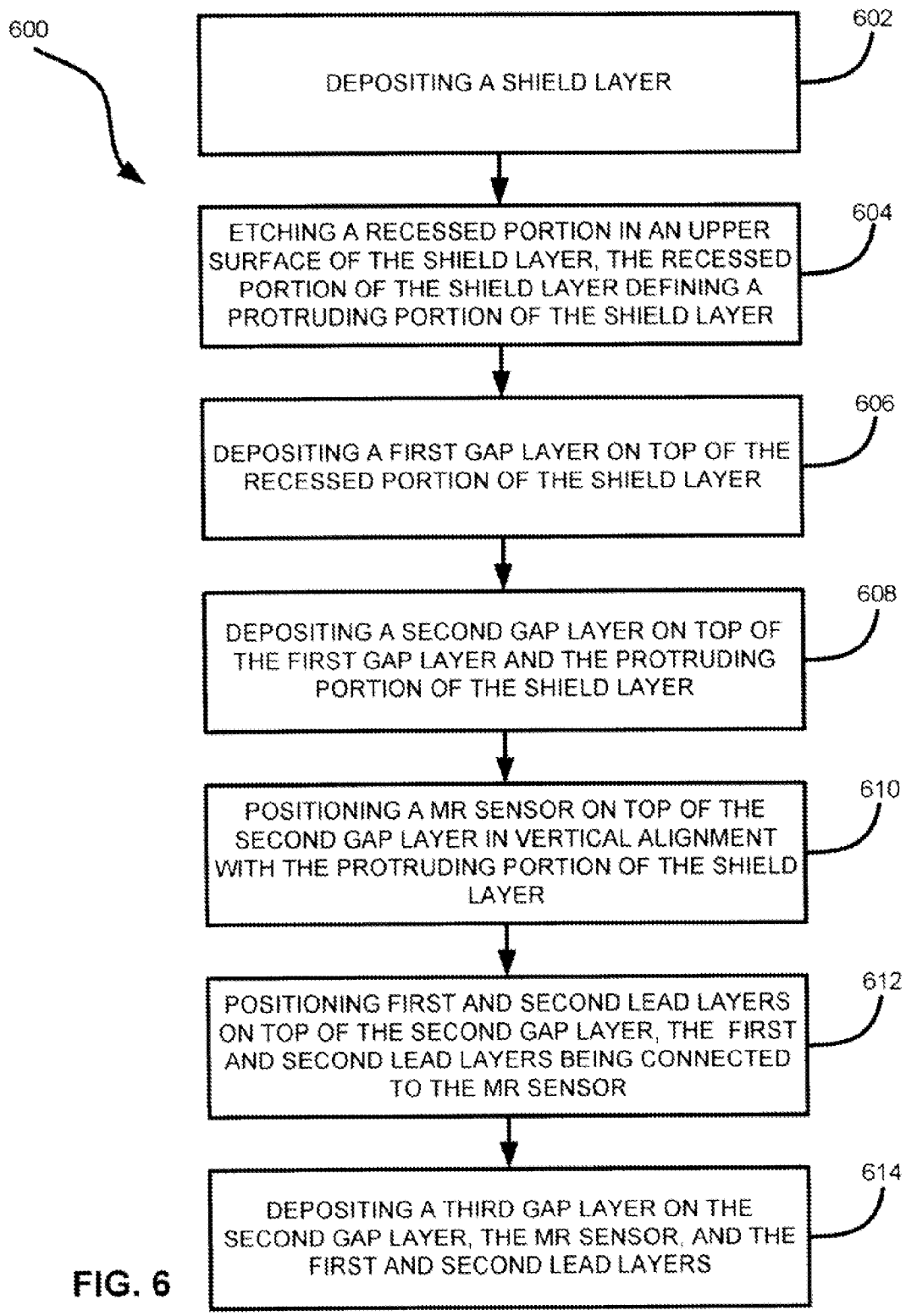
FIG. 6 illustrates a method for fabricating the MR read head of FIGS. 4 and 5.

FIG. 6 illustrates a method 600 for fabricating the MR read head 400 of FIGS. 4 and 5. Initially, in operation 602, the shield layer S1 is deposited on a substrate. Thereafter in operation 604, the recessed portion 402 is etched in an upper surface of the shield layer S1. Such recessed portion 402 of the shield layer S1 defines the protruding portion 404 of the shield layer S1. The recessed portion 402 of the shield layer S1 is preferably of a predetermined depth that effectively provides the desired amount of insulation.

Subsequently, the first gap layer G1 is deposited on top of the recessed portion 402 of the shield layer S1. Note operation 606, As an option a chemical-mechanical polishing process may be carried out on the upper surfaces of the first gap layer G1 and the recessed portion 402 of the shield layer S1. Such chemical-mechanical polishing process serves to remove any residual nonplanarity around the protruding portion 404 of the shield layer S1.

In operation 608, the second gap layer G2 is deposited on top of the first gap layer G1 and the protruding portion 404 of the shield layer S1. Next, in operation 610, the MR sensor is positioned on top of the second gap layer G2 in vertical alignment with the protruding portion 404 of the shield layer S1.

First and second lead layers are subsequently positioned on top of the second gap layer G2. Note operation 612. The first and second lead layers are positioned such that they are connected to the MR sensor. The third gap layer G3 is then deposited on the second gap layer G2, the MR sensor, and the first and second lead layers, as indicated in operation 614. While not shown, another shield layer S2 may be deposited on top of the third gap layer G3 in addition to any remaining layers that are well known to those of ordinary skill.

It should be understood that the order of operations in the method 600 of fabrication may vary per the desires of the user. For example the shield layer S1 and first gap G1 may both be deposited before the patterning and etching processes are carried out to form the recessed portion 402 of the shield layer S1. Thereafter, the second gap layer G2 and the MR sensor may be deposited. While this and other variations are possible, the method 600 of fabrication is preferred since the MR sensor is deposited on a more pristine surface.

Figure 7A:
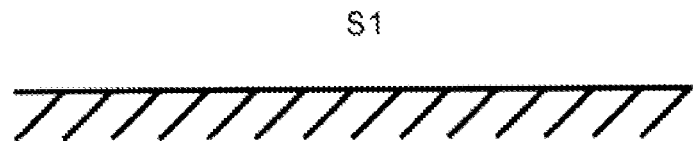
FIGS. 7A-7I illustrate the MR read head during the various stages of fabrication in accordance with FIG. 6.
Figure 7B:
Figure 7C:
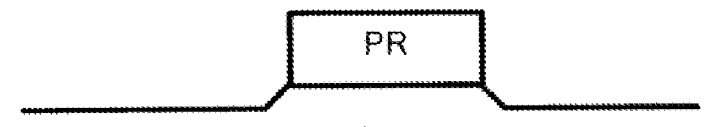

FIGS. 7A-7I illustrate the MR read head during the various stages of fabrication in accordance with FIG. 6. As shown in FIG. 7A, the shield layer S1 is deposited in accordance with operation 602 of FIG. 6. FIG. 7B illustrates the manner in which photoresist PR is deposited in preparation for etching the recessed portion 402 of the shield layer S1 in operation 604 of FIG, 6, FIG. 7C illustrates the results of the etching in accordance with operation 604 of FIG. 6.

Figure 7D:
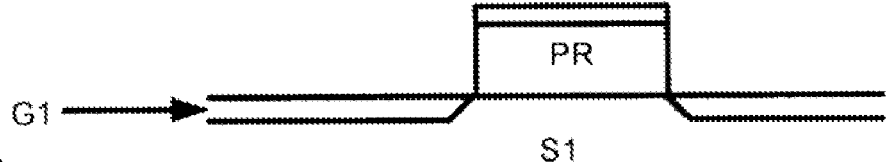
Figure 7E:
Figure 7F:
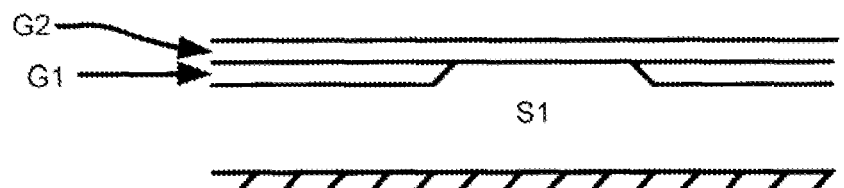

FIG. 7D shows how the first gap layer G1 is deposited an top of the recessed portion 402 of the shield layer S1. Note operation 606 of FIG. 6. FIG 7E illustrates the manner in which the photoresist PR is removed after operation 606 of FIG. 6. The second gap layer G2 is deposited on top of the first gap layer G1 and the protruding portion 404 of the shield layer S1 in accordance with operation 608 of FIG. 6, as shown in FIG. 7F.

Figure 7G:
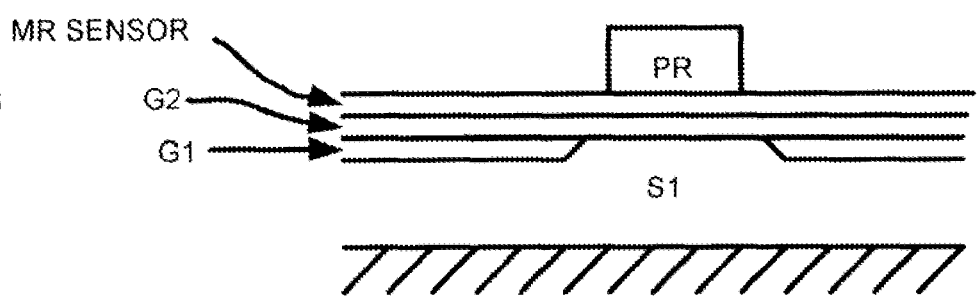
Figure 7H:
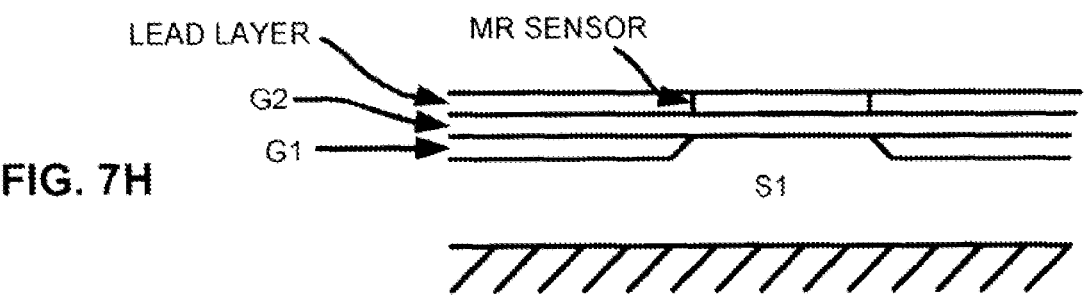

Next, the MR sensor is positioned on top of the second gap layer G2 in vertical alignment with the protruding portion 404 of the shield layer S1 in accordance with operation 610 of FIG. 6. Note FIG. 7G. FIG. 7G also shows additional photoresist PR that is deposited in anticipation of etching the MR sensor layer so that lead layers may be deposited over the second gap layer G2 in accordance with operation 612 of FIG. 6. Note FIG. 7H. As shown in such Figures, the MR sensor and lead layers are planar as a result of being deposited on the planar first gap layer G1 and planar second gap layer G2. This planarity enables the advantages of the present invention.

Figure 7I:
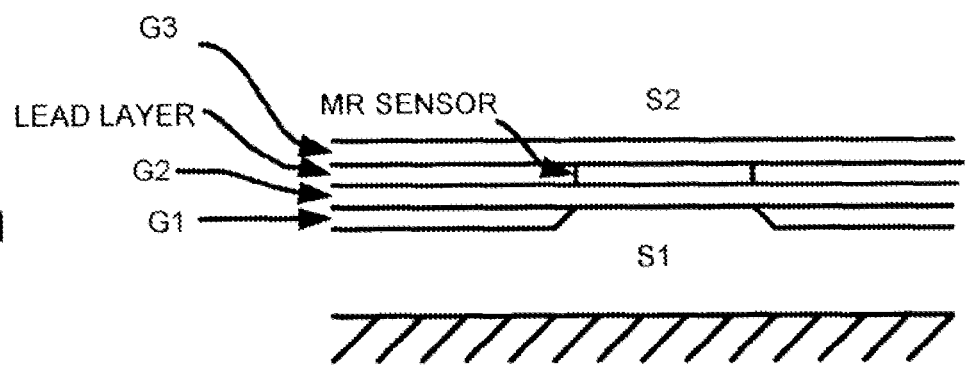

FIG. 7I shows the manner in which the third gap layer G3 is deposited in accordance with operation 614 of FIG. 6. It should be noted that a second shield layer S2 may subsequently be deposited as well.

To this end, the combined thickness of the gap layers is increased to reduce the chance of a short occurring between the lead layers and shield layers S1 and S2. Further beveled edges and nonplanarity are avoided by maintaining planar gap layer surfaces. To this end the detrimental ramifications of reflective notching and the swing curve effect are avoided.

While various embodiments have been described above it should be understood that they have been presented by way of example only and not limitation. Thus, the breadth and scope of a preferred embodiment should not be limited by any of the above-described exemplary embodiments, but should be defined only in accordance with the following claims and their equivalents.

What is claimed is:

1. A magnetoresistive (MR) read head comprising:
    a shield layer with a recessed portion and a protruding portion defined by the recessed portion;
    a first gap layer located on top of the recessed portion of the shield layer, the first gap layer including an upper surface substantially level with an upper surface of the protruding portion of the shield layer;
    a second gap layer located on top of the first gap layer and the protruding portion of the shield layer;
    an MR sensor formed above the protruding portion of the shield layer and the second gap layer;
    wherein a combined thickness of the first gap layer and second gap layer is thinner adjacent to the MR sensor and the protruding portion of the shield layer than the recessed portion of the shield layer.

2. The MR read head as recited in claim 1, further comprising a third gap layer formed above the MR sensor.

3. The MR read head as recited in claim 2, wherein the combined thickness of the first gap layer, second gap layer, and third gap layer is thinner adjacent to the MR sensor and the protruding portion of the shield layer than the recessed portion of the shield layer.

4. The MR read head as recited in claim 1, wherein a size of the protruding portion of the shield layer is slightly larger than a size of the MR sensor.

5. The MR read head as recited in claim 1, wherein the upper surface of the first gap layer is coplanar with an upper surface of the protruding portion of the shield layer.

6. The MR read head as recited in claim 1, wherein an upper surface of the second gap layer is planar.

7. A magnetoresistive (MR) read head comprising:
    a shield layer with a recessed portion and a protruding portion;
    a first gap layer formed above the recessed portion of the shield layer, the first gap layer including an upper surface substantially coplanar with an upper surface of the protruding portion of the shield layer;
    a second gap layer formed above the first gap layer and the protruding portion of the shield layer; and
    an MR sensor formed above the protruding portion of the shield layer and the second gap layer.

8. The MR read head as recited in claim 7, further comprising a third gap layer formed above the MR sensor.

9. The MR read head as recited in claim 8, wherein the combined thickness of the first gap layer, second gap layer, and third gap layer is thinner adjacent to the MR sensor and the protruding portion of the shield layer than the recessed portion of the shield layer.

10. The MR read head as recited in claim 7, wherein a size of the protruding portion of the shield layer is slightly larger than a size of the MR sensor.

11. The MR read head as recited in claim 7, wherein the upper surface of the first gap layer is coplanar with an upper surface of the protruding portion of the shield layer.

12. The MR read head as recited in claim 7, wherein an upper surface of the second gap layer is planar.

13. A magnetoresistive (MR) read head comprising:
    a shield layer with a recessed portion and a protruding portion;
    a first gap layer formed above the recessed portion of the shield layer, the first gap layer including a planar upper surface being contiguous with an upper surface of the protruding portion of the shield layer;
    a second gap layer formed above the first gap layer and the protruding portion of the shield layer; and
    an MR sensor formed above the protruding portion of the shield layer and the second gap layer.

14. The MR read head as recited in claim 13, further comprising a third gap layer formed above the MR sensor.

15. The MR read head as recited in claim 14, wherein the combined thickness of the first gap layer, second gap layer, and third gap layer is thinner adjacent to the MR sensor and the protruding portion of the shield layer than the recessed portion of the shield layer.

16. The MR read head as recited in claim 13, wherein a size of the protruding portion of the shield layer is slightly larger than a size of the MR sensor.

17. The MR read head as recited in claim 13, wherein the upper surface of the first gap layer is coplanar with an upper surface of the protruding portion of the shield layer.

18. The MR read head as recited in claim 13, wherein an upper surface of the second gap layer is planar.

* * * * *

UNITED STATES PATENT AND TRADEMARK OFFICE
CERTIFICATE OF CORRECTION

PATENT NO.        : 7,532,441 B2
APPLICATION NO.   : 11/559353
DATED             : May 12, 2009
INVENTOR(S)       : Werner It is certified that error appears in the above-identified patent and that said Letters Patent is hereby corrected as shown below:

In the abstract:
line 1, change "magetoresistive" to --magnetoresistive--;
line 5, change "including, an upper" to --including an upper--;
line 7, change "shield layer a second" to --shield layer; a second--;
line 8, change "shield layer, an MR sensor" to --shield layer; an MR sensor--.

col. 1, line 14 change "magetoresistive" to --magnetoresistive--;
col. 2, line 1 change "hands" to --hand--;
col. 2, line 31 change "region, Lead" to --region. Lead--;
col. 3, line 8 change "adversely the MR" to --adversely affecting the MR--;
col. 3, line 14 change "magetoresistive" to --magnetoresistive--;
col. 3, line 27 change "magetoresistive" to --magnetoresistive--;
col. 3, line 37 change "magetoresistive" to --magnetoresistive--;
col. 3, line 54 change "magetoresistive" to --magnetoresistive--;
col. 4, line 21 change "rotate slider" to --rotate, slider--;
col. 4, line 57 change "stooge" to --storage--;
col. 4, line 58 change "member" to --number--;
col. 5, line 17 change "effect," to --effect.--;
col. 5, line 30 change "utilizing. Permalloy" to --utilizing Permalloy--;
col. 6, lines 8-9 change "operation 606. As an option a chemical-mechanical" to --operation 606. As an option, a chemical-mechanical--;
col. 6, line 33 change "gap G1" to --gap layer G1--;
col. 6, line 47 change "FIG, 6, FIG. 7C" to --FIG. 6, FIG. 7C--;
col. 6, lines 49-50 change "deposited an top" to --deposited on top--;
col. 6, line 51 change "FIG 7E" to --FIG. 7E--;

UNITED STATES PATENT AND TRADEMARK OFFICE
CERTIFICATE OF CORRECTION

PATENT NO. : 7,532,441 B2
APPLICATION NO. : 11/559353
DATED : May 12, 2009
INVENTOR(S) : Werner It is certified that error appears in the above-identified patent and that said Letters Patent is hereby corrected as shown below:

col. 7, line 7 change "Further beveled" to --Further, beveled--;
col. 7, line 9 change "end the" to --end, the--, Signed and Sealed this Twenty-first Day of July, 2009

JOHN DOLL
*Acting Director of the United States Patent and Trademark Office*